United States Patent
Kiss

(10) Patent No.: US 8,355,913 B2
(45) Date of Patent: Jan. 15, 2013

(54) SPEECH RECOGNITION WITH ADJUSTABLE TIMEOUT PERIOD

(75) Inventor: Imre Kiss, Tampere (FI)

(73) Assignee: Nokia Corporation, Espoo (FI)

( * ) Notice: Subject to any disclaimer, the term of this patent is extended or adjusted under 35 U.S.C. 154(b) by 545 days.

(21) Appl. No.: 11/556,227

(22) Filed: Nov. 3, 2006

(65) Prior Publication Data

US 2008/0109220 A1    May 8, 2008

(51) Int. Cl.
*G10L 15/22*    (2006.01)
*G10L 15/26*    (2006.01)

(52) U.S. Cl. .................. 704/235; 704/251; 704/275

(58) Field of Classification Search .......... 704/235, 704/236, 251, 253, 270, 275
See application file for complete search history.

(56) References Cited

U.S. PATENT DOCUMENTS

| | | | | |
|---|---|---|---|---|
| 5,640,143 A * | 6/1997 | Myron et al. | ................. | 340/541 |
| 5,737,392 A * | 4/1998 | Cheng et al. | ................. | 379/88.19 |
| 5,864,805 A * | 1/1999 | Chen et al. | ................. | 704/235 |
| 6,493,673 B1 * | 12/2002 | Ladd et al. | ................. | 704/275 |
| 6,654,895 B1 * | 11/2003 | Henkhaus et al. | ................. | 713/320 |
| 6,721,698 B1 * | 4/2004 | Hariharan et al. | ................. | 704/203 |
| 6,804,643 B1 * | 10/2004 | Kiss | ................. | 704/234 |
| 7,103,542 B2 * | 9/2006 | Doyle | ................. | 704/231 |
| 7,194,409 B2 * | 3/2007 | Balentine et al. | ................. | 704/253 |
| 7,197,456 B2 * | 3/2007 | Haverinen et al. | ................. | 704/233 |
| 7,269,556 B2 * | 9/2007 | Kiss et al. | ................. | 704/245 |
| 7,319,956 B2 * | 1/2008 | Bossemeyer, Jr. | ................. | 704/243 |
| 7,334,050 B2 * | 2/2008 | Zondervan et al. | ................. | 709/246 |
| 7,668,710 B2 * | 2/2010 | Doyle | ................. | 704/9 |
| 2002/0105575 A1 * | 8/2002 | Hinde et al. | ................. | 348/14.01 |
| 2003/0023435 A1 * | 1/2003 | Josephson | ................. | 704/235 |
| 2004/0153321 A1 * | 8/2004 | Chung et al. | ................. | 704/251 |
| 2005/0071172 A1 * | 3/2005 | James | ................. | 704/275 |
| 2005/0154591 A1 * | 7/2005 | Lecoeuche | ................. | 704/270.1 |
| 2005/0171775 A1 * | 8/2005 | Doyle | ................. | 704/250 |
| 2006/0050638 A1 * | 3/2006 | Meyer et al. | ................. | 370/231 |
| 2006/0080096 A1 * | 4/2006 | Thomas et al. | ................. | 704/234 |
| 2006/0080099 A1 * | 4/2006 | Thomas et al. | ................. | 704/243 |
| 2006/0235685 A1 * | 10/2006 | Nurminen et al. | ................. | 704/235 |
| 2006/0293889 A1 * | 12/2006 | Kiss et al. | ................. | 704/235 |
| 2007/0004462 A1 * | 1/2007 | Lafata et al. | ................. | 455/567 |

(Continued)

FOREIGN PATENT DOCUMENTS

EP    1376999 A1    1/2004

(Continued)

OTHER PUBLICATIONS

Patent Cooperation Treaty, "Notification of Transmittal of the International Search Report and the Written Opinion of the International Searching Authority, or the Declaration." Application No. PCT/IB2007/002900, mailed Mar. 6, 2008.

*Primary Examiner* — Martin Lerner

(74) *Attorney, Agent, or Firm* — Alston & Bird LLP

(57) ABSTRACT

Input of dictated information in an information processing apparatus is controlled. Utterances of speech are detected and interpreted as words. Word by word confirmation of the interpreted words is detected, the confirmation being associated with an adjustable timeout period. The timeout period may be adjusted according to a number of different measures, including an average time needed for confirmation, an average success rate of dictation, by the pace of dictation as performed by a user, and by a user's history based on statistics from previously performed dictation procedures.

16 Claims, 3 Drawing Sheets

U.S. PATENT DOCUMENTS

| | | | |
|---|---|---|---|
| 2007/0100635 A1* | 5/2007 | Mahajan et al. | 704/276 |
| 2008/0154600 A1* | 6/2008 | Tian et al. | 704/251 |
| 2008/0169942 A1* | 7/2008 | Burstrom | 341/22 |
| 2009/0222265 A1* | 9/2009 | Iwamiya et al. | 704/246 |
| 2010/0114944 A1* | 5/2010 | Adler et al. | 707/770 |

FOREIGN PATENT DOCUMENTS

| | | |
|---|---|---|
| EP | 1435605 A2 | 7/2004 |
| WO | 98/50907 A1 | 11/1998 |
| WO | 20051013262 A1 | 2/2005 |

* cited by examiner

SPEECH RECOGNITION WITH ADJUSTABLE TIMEOUT PERIOD

FIELD OF THE INVENTION

The disclosed embodiments relate to a method in an information processing apparatus for controlling input of information, for example for use in a mobile communication terminal, an apparatus configured to perform such a method as well as a computer program performing such a method.

BACKGROUND

Speech recognition, often referred to as automatic speech recognition (ASR), is now used widely in different types of apparatuses, such as mobile communication terminals. Speech recognition applications that enable dictation of words and commands are becoming more and more attractive for users as the terminals are provided with increasing computational power and memory.

The idea of mobile dictation is, for example, to provide an alternative way of information (e.g. text) input for personal communication devices with limited size and keyboard facilities. By providing a robust speech recognition system it may be possible to manufacture smaller devices by simply removing the possibility of keyboard input, by not providing a keyboard, or at least minimizing it.

However, ASR technology is far from being perfect and recognition errors will continue to be a problem in the foreseeable future. Therefore, it is important to minimize any impact of incorrect recognition, not least for the convenience of the user.

State-of-the-art embedded speech recognition systems for command and control (e.g., name dialing) can reach a performance level of 95-99%. However, free dictation is a much more demanding task. The average accuracy of current embedded dictation systems is in the range of 80% to 90% at the word level. Many factors may affect performance, like speaking style, noise level and so on. Performance can be improved by limiting the dictation domain (e.g. personal communication style of messages) resulting in a relatively small and accurate language model, and by using the device in an acoustically clean environment, as well as fine-tuning of the recognition engine.

Embedded dictation applications are inherently complex with many user interface and recognition engine related parameters that need optimization. Many of these parameters can be pre-tuned off-line using, e.g., large speech test databases in workstation simulations. However, user interaction related parameters are very difficult to handle that way.

It is known how to utilize embedded dictation that operates in an isolated-word manner so that the user has to leave short pauses, typically 0.5 to 2 seconds, between words. After each word, a list of candidates is shown on the display for a pre-defined timeout period. The user can accept a word by pressing a key on a keypad, or similar, during the timeout or by waiting until the timeout elapses.

A problem, however, becomes apparent when considering the fact that for optimum user experience, the timeout period has to be different for novice and advanced users. Using a too short timeout period for novice users may be frustrating since incorrect words may get accepted before the user could react and select a candidate word from the displayed list of words. On the other hand, using too long timeout period for advanced users slows down the dictation process, or forces the user to press the joystick for each and every word, even if the word candidate is correct. This may be perceived as unnecessary forced interaction with the application and, needless to say, hence inconvenient from the user point of view.

Changing the timeout period may be possible by manual control using a dictation settings menu, depending on the specific implementation. However, such operations are often considered cumbersome and inconvenient. In fact, a typical user may not even be aware of how to manipulate such settings in the terminal.

SUMMARY

It would be advantageous to overcome the drawbacks relating to the prior art devices as discussed above.

Hence, in a first aspect there is provided a method in an information processing apparatus for controlling input of dictated information, comprising detecting utterances of speech, interpreting the utterances as words, detecting word by word confirmation of the interpreted words, the confirmation being associated with an adjustable timeout period.

Embodiments include those where the word by word confirmation of the interpreted words involves detection of user input actions and adjustment of the adjustable timeout period in dependence of the detected user input actions.

In more detail, further embodiments include those where repeating sequence of steps includes:
  recording an utterance of speech and a time of detection of said utterance,
  providing the utterance to a speech recognition engine,
  receiving interpreted information from the speech recognition engine,
  displaying the interpreted information in the form of a list of at least one candidate word, the list comprising one default candidate word,
  detecting, during a timeout period, any user input action and time of detection, and:
  if a detected user input action indicates that no candidate word is selected, adjusting the value of the timeout period,
  if a detected user input action is a candidate word selection, providing the selected word to a word receiving application,
  providing, if no user input action is detected during the timeout period, a default candidate word to a word receiving application, and
  adjusting the value of the timeout period.

The adjusting of the value of the timeout period may depend on the time of detection of a user input action and in some embodiments, the timeout period depends on an average value of a plurality of values for the time of detection of user input actions.

In further embodiments, the adjusting of the value of the timeout period may depend on, subsequent to a plurality of detections of candidate word selections and detections of no candidate selections, a statistical value calculated based on number of detections of candidate word selections and number of detections of no candidate selections.

In still further embodiments, the adjusting of the value of the timeout period may depend on the time of detection of utterances and in some embodiments the timeout period depends on an average value of a plurality of values for the time of detection of utterances.

In yet further embodiments, the adjusting of the value of the timeout period depends on user specific information and the value of the timeout period may further depend on a user specific statistical value calculated based on a plurality of stored statistical values relating to user specific dictation.

In a second aspect, there is provided an information processing apparatus comprising a processor, a memory, a microphone and a display that are configured to control input of information by detecting utterances of speech, interpreting the utterances as words, detecting word by word confirmation of the interpreted words, the confirmation being associated with an adjustable timeout period.

In a third aspect, a mobile communication terminal is provided that comprises an information processing apparatus as described above.

In a fourth aspect, there is provided a computer program comprising software instructions that, when executed in a computer, performs the method discussed above.

In other words, the timeout for word confirmation is automatically adjusted, based on simple measures of user behavior during the dictation process.

More specifically, as introduced above, the timeout adjustment can be based on one or more of a number of measures. A first measure is an average time needed for confirmation. A second measure is an average success rate of dictation (e.g. the number of times a candidate word is deleted or cancelled vs. the number of times a candidate word is accepted). A third measure is the pace of dictation as performed by the user. Moreover, the timeout adjustment can be based on a fourth measure based on user specific information such as a user ID (e.g. based on a selection from enrolled models) as well as, by a fifth measure by a user's history based on statistics from previously performed dictation procedures.

An advantage of the claimed invention is that it provides a seamless dictation experience for the user from the first time when he/she uses the feature throughout becoming an advanced user. That is, more specifically:

A suitably long timeout is provided by default for novice users, which also guides the user to a safe slow pace for dictation and careful pronunciation of words.

The timeout is gradually reduced after the user has learned to use the application, providing faster response times, and eliciting faster pace of dictation.

Even for advanced users the timeout is increased in case the success rate of dictation deteriorates. The application seemingly slows down, and indicates to the user that slower pace and more careful speaking is needed.

In some more detail, the claimed invention is advantageous in that the first measure gives a good indication on the response time of the user after the candidate list is displayed. The timeout can be adjusted to be slightly longer than the response time. The second measure shows how well the system is performing for a particular user. In case the success rate is low, timeout can be increased. The third measure gives an indication how fast the user is uttering one word after the other. For a slower pace, longer timeout can be a safe choice that is not disturbing. The fourth measure makes it possible to quickly restore the optimum setting in case several users (e.g. family members) are using the same phone. The fifth measure gives a longer time window for evaluation which can make the estimate more reliable (in case the system is used in different environments, e.g., with different noise levels.

PREFERRED EMBODIMENTS

Figure 1:
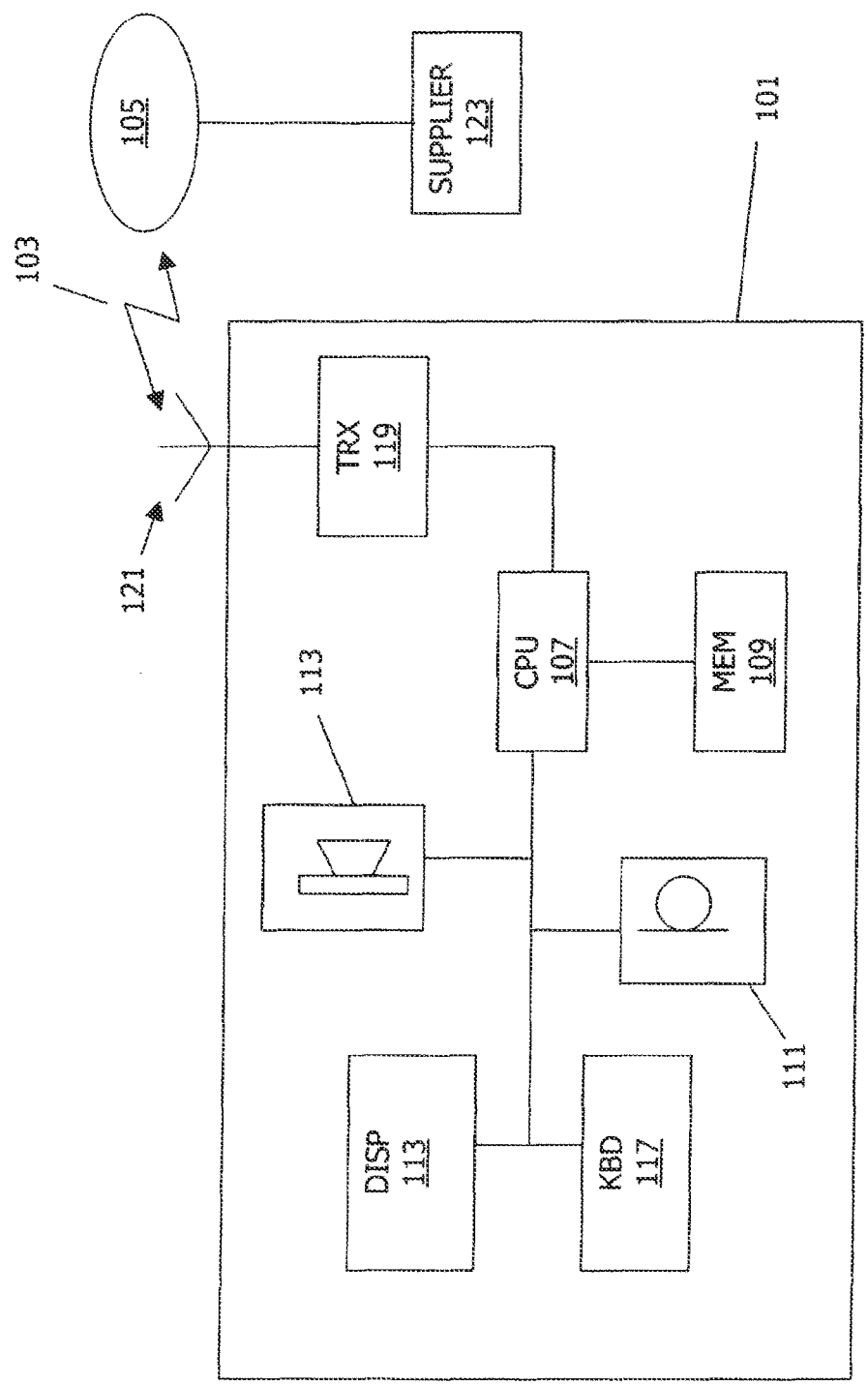
FIG. 1 shows schematically a block diagram of a communication terminal according to the disclosed embodiments.

FIG. 1 illustrates schematically a communication terminal 101 in which the aspects of the disclosed embodiments can be is implemented. The terminal 101 is capable of communication via an air interface 103 with a radio communication system 105 such as the well known systems GSM/GPRS, UMTS, CDMA 2000 etc. The terminal comprises a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further.

The communication terminal 101 may for example be a mobile telephone terminal or a PDA equipped with radio communication means. The method according to the present invention will in generally reside in the form of software instructions, together with other software components necessary for the operation of the terminal 101, in the memory 109 of the terminal. Any type of conventional memory is possible, fixed as well as removable, including a semi-permanent storage chip such as a flash memory card or "memory stick" etc. The software instructions of the inventive notification function may be provided into the memory 109 in a number of ways, including distribution via the network 105 from a software supplier 123.

Figure 2:
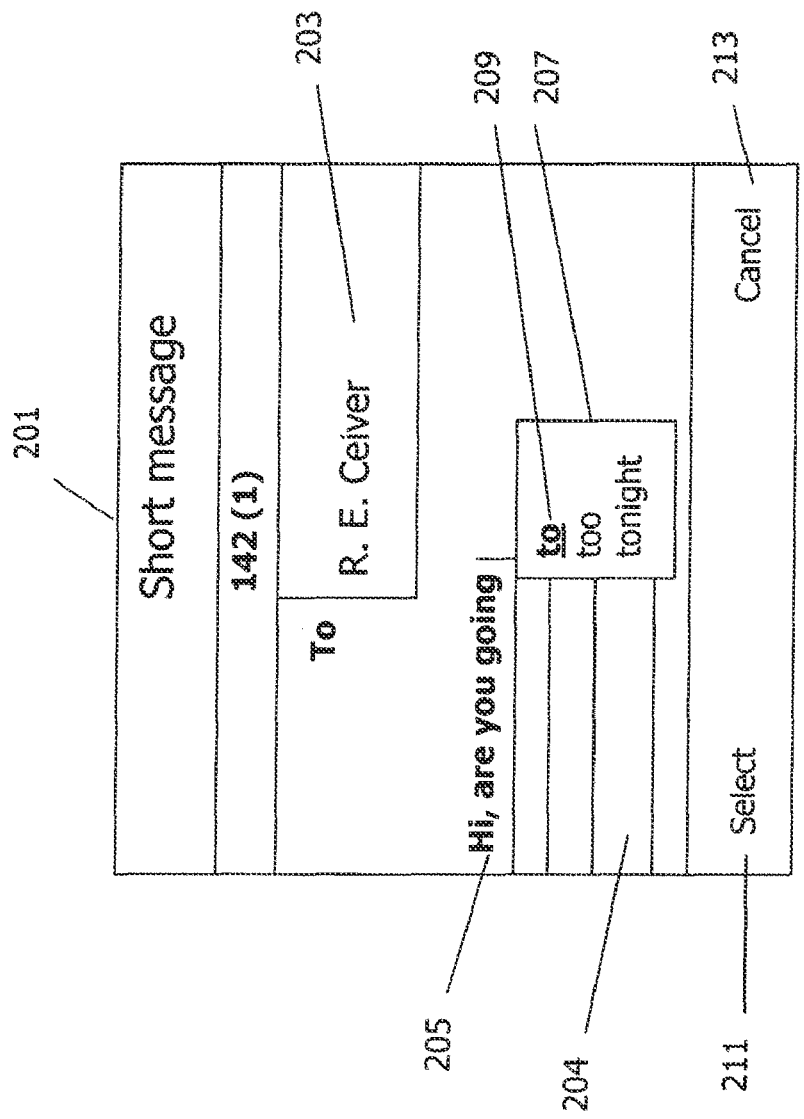
FIG. 2 illustrates the appearance of user interface elements on a display of a terminal during operation of the method of FIG. 3.
Figure 3:
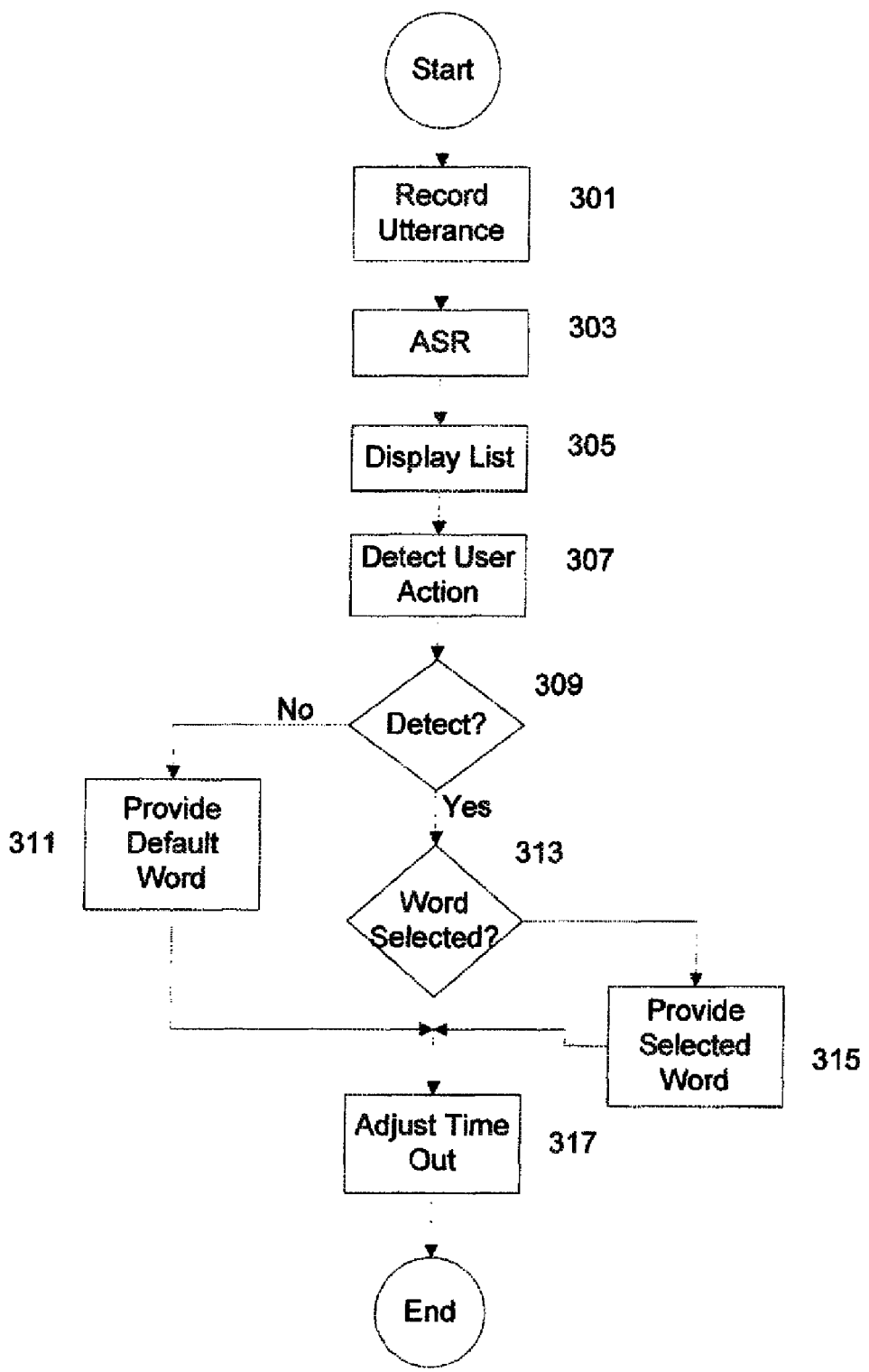
FIG. 3 is a flow chart illustrating a number of steps of a method according to one embodiment.

Turning now to FIGS. 2 and 3, a method according to the invention will be described in terms of a number of steps to be taken by controlling software in a terminal such as the terminal 101 described above in connection with FIG. 1.

The exemplifying method starts at a point in time when a user interface element in the form of a user interface window 201 of a messaging application is displayed on a display of a terminal, such as the terminal 101 described above in connection with FIG. 1. An address field 203, contains a message recipient identifier, which has already been input by a user, e.g. by selection from an contact list stored in the terminal. The user interface window 201 further comprises two so-called soft buttons, a "select" button 211 and a "cancel" button 213. As is known in the art, these soft buttons 211, 213 are typically associated with a key on a keypad (not shown in FIG. 2) located on the terminal in close proximity to the respective soft button. The soft keys may be used to detect user actions such as selection of candidate words, as will be described below. In a case where the terminal is equipped with a touch sensitive display, the soft buttons may be activated by a user touching the display at the position of a soft key.

The user interface window 201 further comprises a message text area 204 in which text 205 is displayed after being input by a user of the terminal. In the present case, the already input text 205 may have been input by way of speech recognition as will be described below or by way of any other text input method. A list 207 of candidate words is displayed on which a default candidate word 209 is highlighted. The list 207 of candidate words has been generated in accordance with the method to be described below. As is known in the art, highlighting and selection of words in the list 207 may be performed by a user by manipulating keypad means.

Hence, with particular reference to FIG. 3, in a recording step 301, a voice utterance made by a user is recorded by the terminal. As is known in the art, the analog signal representing the utterance is digitized and subjected to appropriate processing in order to enable further digital processing.

Then, in a recognition step 303, the utterance is provided to an automatic speech recognition (ASR) engine and is there subject to recognition. The actual recognition process may be performed using any appropriate ASR engine known in the art. The ASR provides a result in the form of a list of candidate words, i.e. the list 207 shown in FIG. 2, and the list is then, in a display step 305, displayed in the user interface window 201 of the terminal.

Then, during a timeout period, any user input action is detected, as realized by a detection step 307 and a first decision step 309. The user input action is typically a soft key action. That is, if it is detected that a user activates a soft key, i.e. any of the soft keys 211, 213, further action is taken, depending on which input action the user performs.

If the detected user input action is an activation of the "select" soft key, it is decided, in a second decision step 313, that the input action is a selection of a candidate word in the displayed candidate list 207. The selected candidate word is then provided, in a provision step 315, to the messaging application.

If the detected user input action is an activation of the "cancel" soft key, it is decided, in the second decision step 313, that none of the candidate words in the displayed candidate list 207 is to be provided to the messaging application.

If no user input action is detected, during the detection step 307 and the first decision step 309, the default candidate word 209 is provided, in a provision step 311, to the messaging application.

After any word has been provided to the messaging application, in either of steps 311 and 315, or if no word was provided as decided in the second decision step 313, the timeout period is adjusted in an adjustment step 317. This adjustment may be realized by an algorithm that gradually lowers the initial value of the timeout as follows:

$$t_i = \alpha t_{i-1} + (1-\alpha)(\beta x_i - t_{i-1}) \quad (1)$$

where $t_i$ is the adapted timeout for word i, $\alpha$ is the adaptation factor, $t_{i-1}$ is the timeout for the preceding word, $x_i$ is the measured user reaction time for word i, and $\beta$ is the safety factor. Typical values of the constants are $\alpha=0.95$ and $\beta=1.5$.

In this form, equation 1 adjusts the timeout period using the above introduced first measure. That is, the average time needed for detecting a confirmation that a candidate word is correct.

Equation 1 can be extended in order to handle at least the second measure, i.e. the average success rate of dictation, which can be exemplified by the number of times a candidate word is deleted or cancelled in relation to the number of times a candidate word is accepted. Such an extension of equation 1 will entail increasing the timeout period if a word that is accepted by a lapsing timeout is deleted by the user. Furthermore, equation 1 may also be extended such that the timeout is never lower than a pre-defined minimum, $t_{min}$.

The invention claimed is:

1. A method comprising:
   detecting utterances of speech in an information processing apparatus for controlling input of dictated information;
   interpreting the detected utterances as words;
   detecting word by word confirmation of the interpreted words, the confirmation being associated with an adjustable timeout period;
   determining that a confirmed word is cancelled;
   determining if a confirmation of the cancelled word is associated with a lapsed timeout period; and
   increasing the adjustable timeout period if it is determined that the cancelled word is associated with the lapsed timeout period.

2. The method of claim 1, wherein the word by word confirmation of the interpreted words involves detection of user input actions and adjustment of the adjustable timeout period in dependence of the detected user input actions.

3. The method of claim 1, comprising a repeating a sequence of steps comprising:
   detecting an utterance of speech and a time of detection of said utterance,
   providing the utterance to a speech recognition engine,
   receiving interpreted information from the speech recognition engine,
   displaying the interpreted information in the form of a list of at least one candidate word, the list comprising one default candidate word,
   detecting, during a timeout period, any user input action and time of detection, and:
   if a detected user input action indicates that no candidate word is selected, adjusting the value of the timeout period,
   if a detected user input action is a candidate word selection, providing the selected word to a word receiving application,
   providing, if no user input action is detected during the timeout period, a default candidate word to a word receiving application, and
   adjusting the value of the timeout period.

4. The method of claim 3, wherein the adjusting of the value of the timeout period depends on the time of detection of a user input action.

5. The method of claim 4, wherein the adjusting of the value of the timeout period depends on an average value of a plurality of values for the time of detection of user input actions.

6. The method of claim 3, wherein the adjusting of the value of the timeout period depends on, subsequent to a plurality of detections of candidate word selections and detections of no candidate selections, a statistical value calculated based on number of detections of candidate word selections and number of detections of no candidate selections.

7. The method of claim 3, wherein the adjusting of the value of the timeout period depends on the time of detection of utterances.

8. The method of claim 7, wherein the adjusting of the value of the timeout period depends on an average value of a plurality of values for the time of detection of utterances.

9. The method of claim 3, wherein the adjusting of the value of the timeout period depends on user specific information.

10. The method of claim 9, wherein the adjusting of the value of the timeout period further depends on a user specific statistical value calculated based on a plurality of stored statistical values relating to user specific dictation.

11. A computer program comprising software instructions recorded in a memory device that, when executed in a computer, performs the method of claim 1.

12. The method of claim 1 wherein the resetting of the initial timeout period is a function of a timeout value for a preceding word and a user reaction time for a current word.

13. The method of claim 1 wherein a value of the adjustable timeout period cannot be reset below a predetermined minimum time period.

14. An apparatus comprising a processor and a memory storing instructions, wherein the memory and stored instructions are configured, with the processor, to cause the apparatus to at least:detect utterances of speech, interpret the detected utterances as words, detect word by word confirmation of the interpreted words, the confirmation being associated with an adjustable timeout period, determine that a confirmed word is cancelled, determine if a confirmation of the cancelled word is associated with a lapsed timeout period, and increase the adjustable timeout period if it is determined that the cancelled word is associated with the lapsed timeout period.

15. A mobile communication terminal comprising an apparatus according to claim 14.

16. A method comprising:
detecting, in an information processing apparatus for controlling input of dictated information, a speech utterance;
providing a candidate word that corresponds to the speech utterance;
detecting a selection or cancellation of the candidate word within an initial timeout period;
detecting a cancellation of a selected candidate word after an expiration of the initial timeout period; and
if the cancelled candidate word was a default selection by virtue of an expiration of the initial timeout period, automatically increasing the initial timeout period.

* * * * *